Dec. 26, 1939.　　　　　E. R. CAPITA　　　　　2,184,283

HEATING APPARATUS AND SUPPLY THEREFOR

Original Filed July 26, 1935

Inventor
Emil R. Capita
by
Walter F. Kaufman
By
Attorney

Patented Dec. 26, 1939

2,184,283

UNITED STATES PATENT OFFICE 2,184,283

HEATING APPARATUS AND SUPPLY THEREFOR

Emil R. Capita, New York, N. Y.

Application July 26, 1935, Serial No. 33,337
Renewed March 18, 1939

18 Claims. (Cl. 250—36)

This invention relates to an apparatus for supplying high frequency alternating electric current for heating materials brought within the field produced by such current.

In supplying high frequency electrical energy to radiators for various purposes, it is desirable in the interests of efficiency and economy, and from a standpoint of current limitations, to establish a condition of resonance between the supply and the load. It has been customary in oscillator circuits excited by the discharge of a gap to inductively couple the primary including its resonating condenser and inductive winding by utilizing the inductive winding for coupling purposes, or to place equal inductive windings in the circuit on each side of the gap and capacitatively couple such primary circuit to the secondary load. The establishing of a resonant condition by means of varying the capacity and inductance in such an arrangement has been difficult due to the fact that in symmetrical circuits it has been necessary to establish identical conditions on each side of the theoretical electrical zero line bisecting the circuit.

According to the present invention, an oscillator circuit is provided which is symmetrical but which is capable of being tuned by the adjustment of a single reactance without unbalancing the symmetrical circuit.

The application of my invention to a crown assembly machine is illustrated and described in the copending application of Ralph R. Clark, Serial No. 72,489, filed April 3, 1936, and is illustrated in my copending application, Serial No. 33,336, filed July 26, 1935, dealing with the problem of securing elements together.

In the accompanying drawing illustrating the present preferred embodiment of my invention:

Figure 1:
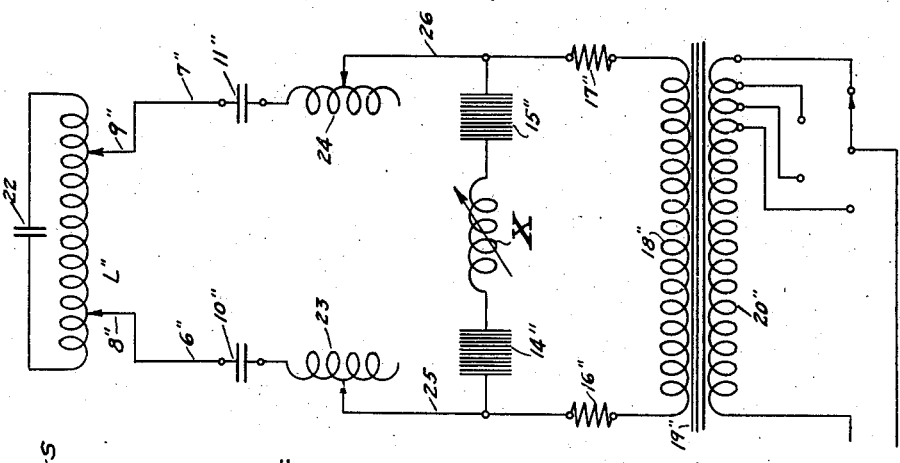
Figure 1 illustrates a preferred oscillator circuit.

Referring first to Figure 1, there is shown a secondary circuit including a coil 2 and a multiple condenser generally referred to at 3, the condenser bank 3 being illustrated as comprising a plurality of capacitative sections in series connection. Leads 4 and 5 from the ends of the condenser bank connect to the coil 2. Leads 6 and 7, capable of being connected to the condenser bank at various points by respective switches 8 and 9, are excited by the discharge of condensers 10 and 11 which are in turn connected through leads 12 and 13 to quenched gap sections 14 and 15, the other ends of which are connected to a variable inductance L, completing the primary circuit. Leads 12 and 13 are connected through damping resistors 16 and 17 which in turn are connected to a high voltage secondary 18 of a transformer 19, the primary 20 of which is energized from a suitable low frequency source not shown. A tap switch 21 is provided to vary the transformation ratio of the transformer 19.

The secondary circuit, here illustrated, comprises the coil 2 and the whole of the condenser bank 3; the primary circuit which excites the secondary, comprises the variable inductance L, the sections 14 and 15 of the quenched gap, the blocking condensers 10 and 11 and such portion of the condenser bank 3 as is embraced by the switches 8 and 9. In operation, the voltage supplied from the secondary 18 through the damping resistors 16 and 17 charges the blocking condensers 10 and 11 to a point where the gap sections 14 and 15 will strike, at which time a damped oscillation threads the gap sections, the inductance L, the blocking condensers 10 and 11 and that portion of the condenser bank 3 embraced by the connections from the switches 8 and 9. The secondary circuit including the coil 2 and the whole of the condenser bank 3 is excited by the discharge through that portion of the condenser 3 embraced between the leads 30 from the switches 8 and 9. It will be clear, from the diagram, that by symmetrically changing the settings of the switches 8 and 9, it is possible to symmetrically vary the ratio of that portion of the condenser bank 3 which is in the primary circuit to that which is in the secondary circuit. I thus provide variable capacitative coupling between the exciter circuit and the secondary. The damping resistors 16 and 17 prevent oscillation through the circuit including the gap sections 14 and 15, the variable inductance L and the secondary 18 of the transformer 19.

Although it is possible to calculate the load on a high frequency heating circuit with a fair degree of accuracy, all factors being known, it is not expedient to experimentally determine all the factors before building the equipment, since variations in commercial operations may result in a change from the factors experimentally determined. It is desirable, therefore, to provide a source of heating current in which coupling between primary and secondary may be varied, and in which a resonant condition may be established between the primary and secondary in a very simple manner and capable of adjustment to varying secondary conditions, inasmuch as the secondary or load circuit is likely to be changed in its electrical characteristics by variations in the load and in the application of the load. Heretofore, the inductance in the primary circuit has been used to inductively couple the primary to the secondary, or has been split to lie on each side of a symmetrical circuit. It is clear to those skilled in the art that changing the former will result in changing the coupling, and adjustment of the latter is difficult since identical coils must be varied identically if the circuit is to remain symmetrical. The advantages of a symmetrical circuit are described in the copending application of Egbert von Lepel, Serial No. 729,217, filed June 6, 1934, prominent among which is the virtual elimination of interference with the reception of radio or wireless communications. The establishment of a symmetrical oscillatory circuit having its theoretical ground line bisecting the circuit results in very little undesired radiation of such character as to cause interference in radio reception.

According to my invention, the controllable inductance of the primary circuit is concentrated and positioned intermediate the sections of the exciting gap. Thus by the simple variation of a single inductance I am enabled to change the impedance of the primary circuit and vary its resonance to match that which may currently obtain in the secondary, without varying the coupling between the primary and secondary and without throwing the primary circuit out of symmetry.

I prefer to capacitatively couple the primary and secondary in order that the whole of the controllable inductance of the secondary be available for radiation of the secondary energy. The preferred method of varying the coupling between the primary and secondary is to symmetrically change the points at which the primary leads tap into the condenser bank 3. It is fairly easy to build equal capacities, and no difficulty is encountered in making a condenser bank capable of being tapped symmetrically on each side of its electrical center and obtain symmetrical results.

The blocking condensers 10 and 11 prevent the low frequency, high voltage current from the secondary 18 of the transformer 19 flowing in the condenser bank 3. They are sufficiently large, however, to carry the high frequency oscillatory discharge from the gap sections 14 and 15. With these limitations in mind, it will be clear that under certain load conditions in the secondary circuit it may be feasible to connect the primary leads 6 and 7 directly to the ends of the condenser bank 3, to the leads 4 and 5. The resonant characteristics of the secondary circuit may be such that, with the degree of coupling desired, such connection is not practicable due to the large capacities involved.

I have found that where large secondary currents are required, it is preferable to use a relatively high primary voltage and relatively low primary current. This is easier on the quenched gap and obviates a large portion of the problem of heat dissipation from the gap. The exciting current is kept relatively low while the exciting or primary voltage is relatively high. The energy transfer to the secondary through the block condensers 10 and 11 is then easily accomplished, even though these blocking condensers be relatively small.

As illustrated in Figure 1, a species of potential coupling is used. The secondary should be excited, and adequately high current should flow therein, but low frequency current should be blocked therefrom and the coupling between the primary and secondary should be sufficiently loose that the primary circuit will not be excited by the secondary voltage, causing the gaps to restrike through excitation from the secondary. Since current limitations in the primary circuit, and other considerations, dictate the use of relatively small blocking condensers 10 and 11, a high voltage is required to obtain a volt-ampere rating to adequately supply energy to the secondary where high current is required. Relatively low voltage in the secondary is desirable from many standpoints, making for ease in insulation, simplifying the mechanical support and disposition of the radiating coil 2. The leads 6 and 7 are tapped into the tank condenser 3 appropriately by the switches 8 and 9 to effect that degree of coupling between the primary and secondary circuits which will be loose enough to avoid the primary circuit being "pulled in" by the secondary and controlled thereby, and tight enough to effect efficient transfer of energy from the primary circuit to the secondary circuit. The potential drop in the primary circuit from the extreme ends of the gap sections 14 and 15 through the blocking condensers 10 and 11 and that portion of the tank condenser connected between the leads 6 and 7 is preferably distributed along those capacitative portions of the circuit in such fashion that approximately one-fifth of the total potential drop occurs in the portion of the tank condenser between the leads 6 and 7. The voltage linkage between the primary and secondary circuits at the time of discharge of the primary circuit is obviously only a portion of the primary voltage in the case illustrated. By means of such capacitative coupling, however, I am enabled to excite the secondary circuit to provide that high current intensity required for induction heating, and, as mentioned before, I am enabled to efficiently use the whole of the controllable inductance in the secondary circuit as a means of radiating the flux used in heating. From the foregoing, it will be seen that there is desired relationship between the size of the blocking condensers and the portion of the tank condenser connected between the leads 6 and 7. A dimensioning of the respective condensers may be effected which will result in any desired portion of the primary potential appearing across the portion of the tank condenser between the leads 6 and 7, within the limitations dictated by the requirement that the blocking condensers be of sufficient size to adequately transfer the energy desired at the frequency desired and be small enough to block the low frequency current from the secondary 18 of the transformer 19. It must be borne in mind also that that portion of the tank condenser 3 which is connected between the leads 6 and 7 from the primary circuit, also forms part of the secondary circuit and further limitations will arise by reason of the requirements of the secondary circuit in the way of adequate current carrying capacity. The secondary potential appears across the leads 4 and 5 from the outer ends of the tank condenser 3, and it is clear that only a portion of such voltage, determined by the positioning of the switches 8 and 9, can be applied to the primary circuit. Accordingly, there is little danger of exciting the primary circuit and causing the gap to restrike, if the coupling is somewhat loose.

Figure 3:
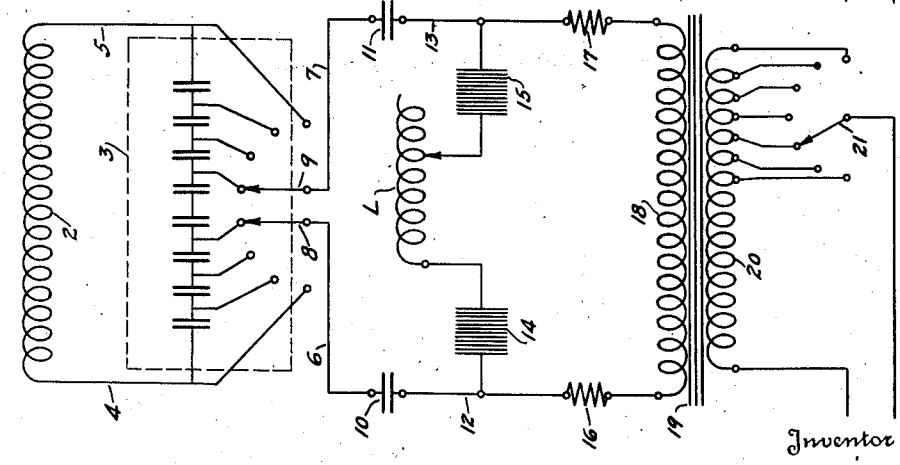
Figure 3 illustrates a modified oscillator circuit.
Figure 2:
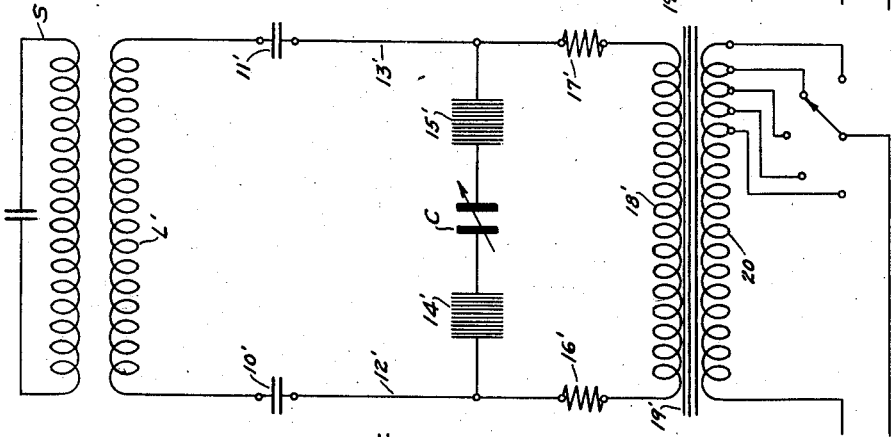
Figure 2 illustrates a modified oscillator circuit.

While I have illustrated and described my invention in connection with a capacitatively coupled circuit in which the controllable inductance of the primary circuit is concentrated intermediate equal sections of a quenched gap to facilitate adjustment without impairing the symmetry of the circuit, it will be understood that only that portion of the inductance required for frequency adjustment need be incorporated in the circuit at the position intermediate the gap sections.

Where it is desired to inductively couple the secondary to the primary circuit, the arrangement shown in Figure 2 may be employed. In Figure 2 there is illustrated a primary high frequency circuit in which an inductance L', inductively coupled to a secondary circuit S, is fed by blocking condensers 10' and 11' through leads 12' and 13' to gap sections 14' and 15' intermediate which sections is disposed a variable condenser C which is capable of adjustment to vary the impedance of the circuit and its resonant frequency without destroying the symmetry of the arrangement. Damping resistors 16' and 17' are connected to a high voltage secondary 18' of a transformer 19', the primary 20' being connected to a suitable low frequency source not shown.

Where it is desired to inductively couple the load, as in the case of a crucible furnace in which the crucible and/or the material being heated is within the field of the secondary circuit, the circuit illustrated in Figure 3 may be used to advantage. In this circuit there is provided a high frequency primary circuit in which the inductance L'' constitutes the secondary inductance being tuned by a suitable condenser 22. The primary circuit, as illustrated, is conductively coupled to the inductance L'' by taps 8'' and 9'' whereby a portion of the inductance L'' is included in the primary circuit. Leads 6'' and 7'' connect the taps 8'' and 9'' to blocking condensers 10'' and 11'' which in turn are connected through inductances 23 and 24 which are arranged to be variable identically. The variable inductances 23 and 24 are connected through leads 25 and 26 to gap sections 14'' and 15'', intermediate which sections is disposed a variable inductance X. Also connected to leads 25 and 26 through damping resistors 16'' and 17'' is a high voltage secondary 18'' of a transformer 19'', the primary 20'' of which is connected to a suitable low voltage source not shown.

Adjustment of the arrangement shown in Figure 3 is accomplished by setting the variable inductances 23 and 24 identically, adjusting the taps 8'' and 9'' on the inductance L'' to conductively couple the primary circuit to the secondary circuit at the desired degree of coupling, and adjusting the variable inductance X to bring the primary circuit into resonance with the secondary circuit, the latter comprising the condenser 22 and the whole of the inductance L''. In this arrangement, it is possible to have included between the gap sections 14'' and 15'' a variable inductance of relatively small impedance range, merely that required to change the resonant frequency over ranges to be encountered, the main inductance of the circuit being embraced within the identical variable inductances 23 and 24. It will be understood that for convenience sake the inductances 23 and 24 are preferably varied by tap switches. The arrangement shown in Figure 3 is, like that shown in Figures 1 and 2, capable of supplying a large current at low voltage and high frequency in the secondary, although the primary current is kept relatively low at a somewhat higher potential.

A symmetrical circuit as described herein, and as referred to in my said copending application, Serial No. 33,336, filed July 26, 1935, and the said application of Egbert von Lepel, Serial No. 729,217, filed June 6, 1934, is advantageous in that the maximum electrical potential difference between the high tension distributing system and ground is not of the order of the potential difference developed across the whole secondary system, but is materially less, resulting in greater ease of insulation, and a greater degree of safety and convenience in operation of equipment embodying this improved high frequency supply system. There is less tendency for the machine parts to become "hot" from induced electrical charges, since the potential difference between the machine and the instant point of highest potential difference in the secondary or exciter circuits is approximately one-half of what it would be were one side of the system grounded. As a consequence, equipment embodying such improved high frequency supply apparatus may be more compactly built with greater safety and with less insulation being required. Moreover, less energy is dissipated to ground, resulting in economy of operation. Greater freedom from interference with radio reception has been noted above.

A specific advantage of inserting a controllable impedance in the electrical center of the spark gap system is the ease with which the resonant frequency of the exciter circuit may be changed to correspond to the frequency at which the secondary circuit will then resonate. In commercial applications, the characteristics of the secondary circuit may be affected by the character of the work to be done, and changes in the shape or character of articles subjected to the high frequency field of the secondary circuit will frequently result in a change in the resonant frequency of such circuit. It is a feature of my invention that the primary or exciting circuit may be rapidly and conveniently adjusted to resonate at the resonant frequency of the secondary circuit without unbalancing the symmetry of potential distribution of the system. Where my high frequency supply system is used for diathermy apparatus, the maintenance of such symmetry of potential distribution is desirable to avoid radio interference in the vicinities of laboratories and hospitals employing such equipment, and in such equipment, as in commercial heating equipment, the maintenance of symmetrical potential distribution is desirable when regarded from the standpoint of insulation problems and losses to adjacent bodies at ground potential. In accordance with my invention, the exciter circuit may be brought into resonance with the secondary circuit without changing the coupling. Relatively unskilled operators are able to operate my apparatus at maximum efficiency by merely noting a current meter for maximum current while adjusting a single control which lies on the neutral axis of the circuit and is, therefore, easily accessible electrically, without involving the hazards which would be entailed by an operator at ground potential adjusting a device carrying the maximum potential developed across the primary or secondary circuits.

While I have illustrated and described the present preferred embodiment of my invention, it will be understood that my invention is not so limited but may otherwise be practiced and embodied within the scope of the following claims.

I claim:

1. In an oscillator for supplying high frequency current, a symmetrical circuit including equal discharge means which, when discharged, produces a high frequency oscillatory current, an adjustable reactance means connected therebetween in series therewith and in the electrical center of the series, a complementary reactance means connected in series with equal blocking condensers, the blocking condensers being each respectively connected to the other terminals of the discharge means, both the said reactance means and the blocking condensers constituting a resonant circuit, the resonant frequency of which is variable by adjustment of the first mentioned reactance means.

2. In an oscillator for supplying high frequency current for heating purposes, a symmetrical circuit including a secondary reactance means for radiating energy from the circuit, a complementary reactance means in circuit with the first mentioned secondary reactance means, both the said reactance means comprising a resonant secondary circuit, a plurality of means of high frequency electrical discharge, an adjustable primary reactance means connected in series with the means of high frequency electrical discharge and in the electrical center of the series, equal blocking condensers connected to the other terminals of the means of high frequency electrical discharge, and means coupling the blocking condensers with the second mentioned secondary reactance means and connected with the adjustable primary reactance means to constitute a resonant primary circuit, such coupling being bi-symmetric whereby the reactance means aforesaid all lie on the theoretical electrical median line of the circuit, and variation of the adjustable primary reactance means to change the resonant frequency of the primary circuit may be effected while maintaining the symmetry of potential distribution in the system.

3. In an oscillator for supplying high frequency current for heating purposes, a symmetrical circuit including a secondary inductance for radiating energy from the circuit, a capacity in circuit with the secondary inductance, the inductance and capacity comprising a resonant secondary circuit, a plurality of means of high frequency electrical discharge, an adjustable primary inductance connected in series with the said means of high frequency electrical discharge and in the electrical center of the series, equal blocking condensers connected to the other terminals of the means of high frequency electrical discharge, and means connecting said blocking condensers respectively to said secondary capacity at points equidistant from the electrical center of the capacity, whereby capacitative coupling is effected between the primary and secondary circuits and all of the reactance means aforesaid lie on the theoretical electrical median line, permitting variation of the adjustable inductance for changing the frequency of resonance of the primary circuit while maintaining the symmetry of potential distribution in the system.

4. In an oscillator for supplying high frequency current for heating purposes, a symmetrical circuit including a plurality of quenched spark gaps, adjustable reactance means connected in series with said gaps and in the electrical center of the series, complementary reactance means connected through equal blocking condensers to the other terminals of the gaps, the said reactance means and blocking condensers constituting a resonant circuit, the resonant frequency of which is variable by adjustment of the first mentioned reactance means.

5. In an oscillator for supplying high frequency current for heating purposes, a symmetrical circuit including a low frequency source of high voltage, variable reactance means, similar spark gaps connected between the respective terminals of the variable reactance means and the source of high voltage, another reactance means for radiating high frequency energy, said second reactance means having its terminals connected through equal blocking condensers to said spark gaps, each of said reactance means lying on the theoretical electrical median line of said symmetrical circuit, whereby adjustment of the first mentioned reactance means for changing the impedance of said circuit effects a change in the impedance of the circuit without affecting the symmetry of voltage distribution.

6. In an apparatus for supplying high frequency current for heating purposes, a high voltage low frequency source, a condenser having its terminals connected to said low frequency high voltage source through equal blocking condensers of insufficient size to pass the low frequency current from said source in any appreciable amount, a variable inductance, and a plurality of spark gaps respectively connected between the terminals of said variable inductance and the terminals of said blocking condensers which are connected to said low frequency high voltage source, said variable inductance, spark gaps, blocking condensers and said first mentioned condenser constituting a resonant symmetrical circuit, the said variable inductance lying along the theoretical median of the symmetrical circuit, whereby adjustment of said variable inductance for changing the resonant frequency of said circuit effects such change while maintaining the symmetry of the circuit.

7. In an apparatus for supplying high frequency current for heating purposes, a secondary circuit including an inductance for radiation of high frequency flux, a capacity connected with said inductance, the inductance and capacity constituting a resonant circuit, a primary circuit including a variable inductance, a plurality of means of oscillatory electrical discharge connected to the terminals of said inductance, the other terminals of said means of oscillatory electrical discharge being connected into said capacity at respective points of equal capacity from the electrical center of said capacity, whereby the primary and secondary circuits are symmetrical and the variable inductance is adjustable for resonating the primary to the secondary while maintaining the symmetry of the circuit, and the primary is capacitatively coupled to the secondary.

8. In an apparatus for supplying high frequency current for heating purposes, a high capacity low inductance secondary circuit for carrying a high frequency current at relatively low voltage, and a high inductance low capacity primary circuit for carrying a high frequency high voltage current for exciting said secondary, said primary and secondary circuits constituting a bi-symmetrical system, said primary circuit including a variable inductance on the axis of symmetry, a plurality of means of oscillatory electrical discharge connected to said variable inductance and having their other respective terminals connected to a capacity also lying on the axis of symmetry, the terminals of said capacity being connected through equal capacities to the secondary inductance, whereby the primary circuit is capacitatively coupled to the secondary circuit, and the variable inductance in the primary circuit lying on the axis of symmetry may be adjusted for changing the resonant frequency of the primary circuit while maintaining the symmetry of potential distribution in the system.

9. In an apparatus for supplying high frequency current for inductive heating, a secondary inductance coil for carrying the high frequency current supplied and transferring energy from the apparatus to an article to be heated, a multiple capacity connected with said coil, the coil and multiple capacity constituting a symmetrical secondary circuit, a variable inductance, a plurality of means of oscillatory electrical discharge connected to the terminals thereof, equal blocking condensers connected to the other respective ends of said means of oscillatory electrical discharge, and leads connecting said blocking condensers to the multiple capacity forming part of the said secondary circuit, said leads being connected at points equally spaced electrically from the electrical center of said multiple capacity, thereby forming a symmetrical primary circuit and symmetrical secondary circuit capacitatively coupled, the variable inductance in the primary circuit lying on the axis of symmetry, whereby adjustment of said inductance to resonate the primary circuit to a desired frequency may be effected while maintaining the symmetry of potential distribution in the system.

10. In an apparatus for supplying high frequency current for inductive heating, a secondary inductance coil for carrying the high frequency current supplied and transferring energy from the apparatus to an article to be heated, a multiple capacity connected with said coil, the coil and multiple capacity constituting a symmetrical secondary circuit, a variable inductance, a plurality of means of oscillatory electrical discharge connected to the terminals thereof, equal blocking condensers connected to the other respective ends of said means of oscillatory electrical discharge, and leads connecting said blocking condensers to the multiple capacity forming part of the said secondary circuit, said leads being connected at points equally spaced electrically from the electrical center of said multiple capacity, thereby forming a symmetrical primary circuit and symmetrical secondary circuit capacitatively coupled, said blocking condensers being each smaller than the portion of the multiple capacity included between the leads from the blocking condensers to provide only a portion of the total primary potential for coupling purposes, the variable inductance in the primary circuit lying on the axis of symmetry, whereby adjustment of said inductance to resonate the primary to the secondary may be effected while maintaining the symmetry of potential distribution in the system.

11. In an apparatus for supplying high frequency current for inductive heating, a bi-symmetric circuit including a high voltage, low current, low frequency source; equal oscillatory electrical discharge elements connected across said said source and having their other respective terminals connected by a variable inductance, equal blocking condensers connected to the equal oscillatory discharge elements, each of the blocking condensers being connected to one side of said source, said blocking condensers being of insufficient size to pass any appreciable amount of low frequency current from said source and being large enough to be capable of transmitting the high frequency current produced by the oscillatory electrical discharge elements; a capacity connected in series with said blocking condensers; the variable inductance, oscilaltory discharge elements, blocking condensers and capacity constituting a symmetrical primary circuit with the capacity and inductance lying on the axis of symmetry; equal capacities, each connected to the terminals of said capacity in the primary circuit, and a secondary inductance, the terminals of which are connected to the respective terminals of said equal capacities, thereby forming a symmetrical secondary circuit including the inductance coil, the equal capacities, and the capacity forming part of the primary circuit, whereby the primary circuit is capacitatively coupled to the secondary circuit with a portion only of the primary potential available across the coupling capacity, and the variable inductance in the primary is available for resonating the primary at a desired frequency while maintaining the symmetry of potential distribution in the system.

12. In an oscillator for supplying high frequency current for heating purposes, at least two quenched spark gaps, an inductance and a variable condenser, the inductance and condenser being connected to form a resonant circuit, a low frequency high voltage source, the variable condenser being connected in series with the quenched spark gaps and in the electrical center of the series, the other terminals of the spark gaps being connected to the low frequency high voltage source and in electrical circuit with the inductance, adjustment of the variable condenser being effective to change the resonant frequency of the circuit including the condenser and inductance while maintaining the symmetry of potential distribution of the high frequency circuit.

13. In an oscillator for supplying high frequency current for heating purposes, at least two quenched spark gaps, a variable inductance connected in series with the quenched spark gaps and in the electrical center of the series, a low frequency high voltage source connected to the other terminals of the quenched spark gaps, a plurality of identically adjustable reactance means each connected to the said other terminals of the spark gaps, blocking condensers connected in series with said identically adjustable reactance means and a load circuit connected to the other terminals of said blocking condensers.

14. In an oscillator for supplying high frequency current for heating purposes, a plurality of high frequency electrical discharge means connected in series, variable reactance means connected in the electrical center of said series of electrical discharge means, a plurality of identical reactance means connected to the end terminals of said series, blocking condensers in series with said identical reactance means and reactance means connected to said blocking condensers and intermediate the same, all of said reactance means, condensers and high frequency electrical discharge means being equally divided on each side of the electrical center of the circuit, thereby forming a bi-symmetric high frequency oscillatory circuit whose frequency of resonance is adjustable by variable reactance means at the electrical center thereof while maintaining symmetry of the circuit.

15. In an oscillator for supplying high frequency electrical current, a plurality of equal high frequency electrical discharge means, a source of low frequency alternating current, a resonant load, a variable impedance connected between said discharge means in the electrical center thereof for varying the resonant frequency of the oscillator, means for connecting said source across the other terminals of said discharge means, and means for connecting said resonant load across said last mentioned terminals of said discharge means, whereby the resonant frequency may be varied while maintaining a desired coupling to said load and the symmetry of potential distribution in the system.

16. An oscillator for supplying high frequency electrical current in accordance with claim 15 in which the variable impedance connected between the discharge means in the electrical center thereof for varying the resonant frequency of the oscillator is a variable condenser.

17. An oscillator for supplying high frequency electrical current in accordance with claim 15 in which the variable impedance connected between the discharge means in the electrical center thereof for varying the resonant frequency of the oscillator is a variable inductance.

18. An oscillator for supplying high frequency electrical current in accordance with claim 15 in which the plurality of equal high frequency electrical discharge means are spark gaps.

EMIL R. CAPITA.